United States Patent [19]

Calhoun

[11] 4,347,542

[45] Aug. 31, 1982

[54] RATIO GROUND RELAY

[75] Inventor: Howard J. Calhoun, Coral Springs, Fla.

[73] Assignee: Westinghouse Electric Corp., Pittsburgh, Pa.

[21] Appl. No.: 245,769

[22] Filed: Mar. 20, 1981

[51] Int. Cl.³ .............................................. H02H 3/26
[52] U.S. Cl. ...................................... 361/76; 361/77; 361/85
[58] Field of Search ...................... 361/76, 77, 85, 86, 361/87, 210

[56] References Cited

U.S. PATENT DOCUMENTS 1,702,454  2/1929  Todd ................................. 361/77 X
4,297,740 10/1981  Hagberg ............................... 361/67

OTHER PUBLICATIONS

Summary and Status Report on Research to Detect and De-Energize High Imp. Faults on 3φ, 4 Wire, Dist. CKTS; Kilar and Lee.
It's Tough to Relay High-Imp. Faults, Wolff, Electrical World, Aug. 1, 1979; pp. 32, 33.
pp. 1190-1200, IEEE Transactions on Power Apparatus and Systems, vol. PAS-90, No. 3, May/Jun. 1971.
Instruction Leaflet 41-1107A K CW A.
Innovative Relay Methods for Det. High Imp. Faults on Dist. CKTS, Amer. Power Conf., Apr. 23-26, 1979, L. A., Kilar et al.
Improved Relay Schemes for Det. of Fallen Conductors on 3φ, Wire, Dist. CKTS, Kilar, Rosado, Shankle & Lee.

Primary Examiner—Reinhard J. Eisenzopf
Attorney, Agent, or Firm—D. R. Lackey

[57] ABSTRACT

A ratio ground induction disc relay which detects open phase conductors on electrical distribution circuits, as well as single-phase-to-ground faults regardless of fault impedance, by providing an operating quantity responsive to zero sequence current, and a restraining quantity responsive to the positive sequence current $I_1$ minus the negative sequence current $I_2$. The restraint quantity is provided by an electromagnetic having first and second outer legs and an inner leg. Electrical windings are disposed on only the first and second outer legs, arranged and energized by the three phase currents to provide equal length flux paths, and thus equal torques, regardless of the faulted phase.

6 Claims, 11 Drawing Figures

RATIO GROUND RELAY

BACKGROUND OF THE INVENTION

1. Field of the Invention

The invention relates in general to protective relay apparatus for electrical power systems, and more specifically to protective relay apparatus for detecting and clearing single-phase-to-ground faults, regardless of fault impedance.

2. Description of the Prior Art

A conventional distribution substation for supplying three-phase and single-phase loads includes a three-phase circuit breaker equipped with phase overcurrent relays, and sometimes a ground-current relay. Reclosers and fuses complete the protection of the distribution circuit. Coordination is necessary between these protective devices in order to isolate only the required portion of the distribution circuit when a fault occurs. Because of normal circuit load unbalances, as well as normal cold-load pickup and switching surges, a ground relay, if used, must be set quite high in order to prevent nuisance tripping of the circuit breaker. Broken conductors close to or touching the ground through high impedance paths may not produce enough current or circuit unbalance to operate the phase overcurrent protective devices, or the ground relay.

Co-pending application Ser. No. 245,768, filed Mar. 20, 1981, entitled "Ratio Ground Relays", by Warren J. Schmidt, which is assigned to the same assignee as the present application, discloses a new and improved ratio ground relay which will detect such high impedance single-phase-to-ground faults. This ratio ground relay is an electromechanical relay of the induction disc type having an "operate" electromagnet which provides an operating torque as a function of the zero sequence current $3I_0$, and a "restraint" electromagnetic which provides a restraint torque as a function of the positive sequence current $I_1$ minus the negative sequence current $I_2$. The restraint electromagnet includes a three-legged magnetic core structure, with a winding on each leg energized by a different phase current, which arrangement provides the $I_1 - I_2$ characteristic.

SUMMARY OF THE INVENTION

The electromechanical ratio ground relay of the hereinbefore mentioned co-pending application provides a desirable solution to the high impedance phase-to-ground fault problem. The induction disc relay provides adequate sensitivity, it is extremely reliable, low cost, highly noise immune, and it inherently provides the desired coordination characteristic for cooperating with the other protective devices, such as fuses, reclosers, and overcurrent protective relays. The present invention improves upon the electromechanical induction disc ratio ground relay of the co-pending application by improving the equality of relay response for a given type fault for all phase combinations, i.e., AB with C grounded, BC with A grounded, and CA with B grounded. It was discovered that the relay of the co-pending application, which has the three legs of an E-shaped magnetic core unit excited by the three-phase currents, provided less restraint torque for one of the fault combinations than for the other two fault combinations. The present invention provides an electromechanical ratio ground relay which provides the same restraint torque for a given fault, regardless of the faulted phase, by exciting one of the outer legs of the E unit as a function of one of the phase currents minus a second one of the phase currents, and by exciting the remaining outer leg as a function of the remaining or third one of the phase currents minus the second one of the phase currents. The inner leg is devoid of windings.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENTS

Figures 1, 2:
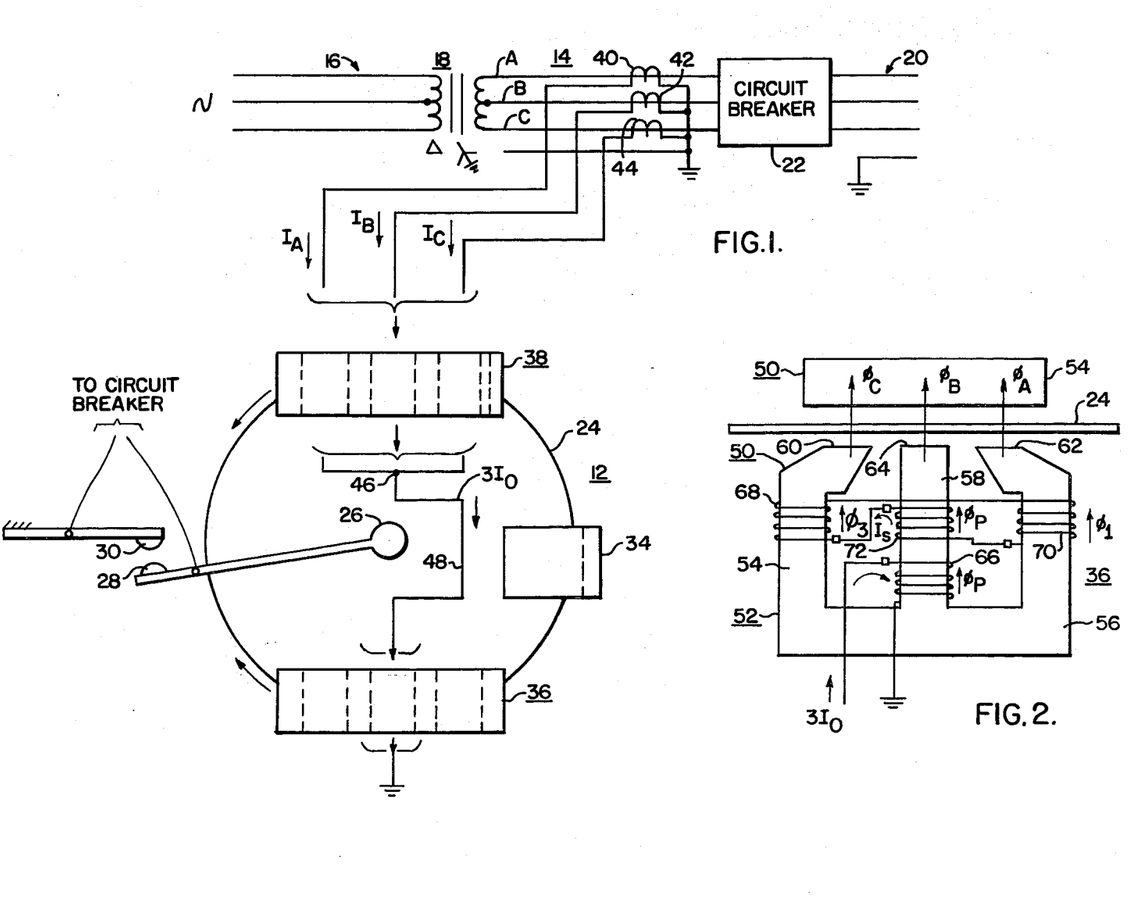
FIG. 1 is a partially schematic and partially diagrammatic view of an electromechanical ratio ground relay which may be constructed according to a teaching of the invention.
FIG. 2 schematically illustrates an "operate" electromagnet which may be used with the relay shown in FIG. 1.

Referring now to the drawings, and to FIG. 1 in particular, there is shown a ratio ground or percent unbalance relay 12 constructed according to the teachings of the invention. Relay 12, which is an electromechanical relay of the electroresponsive induction disc type, is associated with a substation 14 in which transmission voltage of a three-phase transmission line 16 is stepped down to a distribution level via a step-down transformer 18 which supplies a three-phase, four-wire distribution circuit 20 via a three-phase circuit breaker 22. The electroresponsive induction disc relay 12 includes an electroconductive armature 24 in the form of a disc. Armature 24 is mounted for rotation on a suitably journaled shaft 26. The rotation of armature 24, and thus shaft 26, is arranged to cause the actuation of electrical contacts. For purposes of example, a first contact 28 is shown carried by shaft 26. Rotation of shaft 26 carries the first contact 28 into, or out of, engagement with a second contact 30, depending upon rotational direction. Closure of the first and second contacts 28 and 30 may be employed to complete an electrical circuit for any desired protective function, such as for initiating the tripping of circuit breaker 22. A spiral spring (not shown) biases shaft 26 to urge the movable first contact 26 away from the stationary contact 30 and against a suitable stop. If desired, the spiral spring may be a current carrying element which may additionally function to mount the movable first contact 28.

Rotation of armature 24 is damped and retared by suitable damping means, such as a C-shaped permanent magnet 34, which is coupled with armature 24 to provide a damping force which varies in accordance with the rate of rotation of armature 24.

In order to provide an operating torque for armature 24, which torque rotates the armature 24 in the contact closing direction, a first electromagnet 36 is provided.

In order to provide a restraining torque for armature 24, which torque rotates armature 24 in the contact opening direction, a second electromagnet 38 is provided. The second electromagnet 38 is energized by the phase currents flowing in phases A, B and C of the distribution circuit 20, such as measured by current transformers 40, 42 and 44, respectively. These current transformers may be the same current transformers already present at the substation for providing current for the overcurrent relays. Relay 12 may replace the normal ground relay used at the substation. The outputs of current transformers 40, 42 and 44, after providing current signals for the ratio ground relay 12, and any other protective function, are connected together at 46 to provide a single conductor 48. Any unbalanced or ground current in the three-phase distribution circuit will flow in conductor 48 as the zero sequence current $3I_0$. The zero sequence current $3I_0$ is used to energize the first electromagnet 36.

The details of a suitable first electromagnet 36 are shown in FIG. 2 for purposes of example, in order to illustrate a practical arrangement for the "operate" electromagnet. However, any winding/core configuration which produces an operating torque as a function of the $3I_0$ current may be used.

More specifically, the first electromagnet 36 includes a magnetic core structure 50 having an E-shaped unit 52 disposed on one side of armature 24, and a keeper unit 54 disposed on the other side. The E unit 52 includes first and second outer legs 54 and 56, respectively, and an inner leg 58, with the ends of the legs defining pole faces 60, 62 and 64, respectively, which are disposed in predetermined spaced relation with armature 24. The keeper unit 54, which completes the magnetic circuit between the pole faces, is disposed in predetermined spaced relation with armature 24, but on the opposite side of armature 24 from the E-shaped unit. A primary winding 66 is disposed in inductive relation with the inner winding leg 58, windings 68 and 70 are disposed in inductive relation with the first and second outer legs 54 and 56, respectively, and a secondary winding 72 is disposed in inductive relation with the inner leg 58. The three windings 68, 70 and 72 are connected in a delta arrangement, with the dotted end of winding 70 connected to the undotted end of winding 72, the dotted end of winding 72 connected to the dotted end of winding 68, and the undotted end of winding 68 connected to the undotted end of winding 70. The primary winding 66 is energized by the $3I_0$ current to provide a magnetic flux $\phi_P$. The flux $\phi_P$ links the secondary winding 72 to induce a voltage $V_s$ therein to cause a secondary current $I_s$ to flow and energize windings 68 and 70. Thus, magnetic flux is provided in each leg which flows in magnetic paths which include the gaps between the E and keeper units 52 and 54, respectively, and thus the magnetic flux cuts the armature 24 to cause a torque to be produced in the operating or contact closing direction. The magnetic fluxes which extend between pole faces 62, 64 and 60 and the keeper unit 54 are referred to as $\phi_A$, $\phi_B$ and $\phi_C$, respectively.

Figure 3:
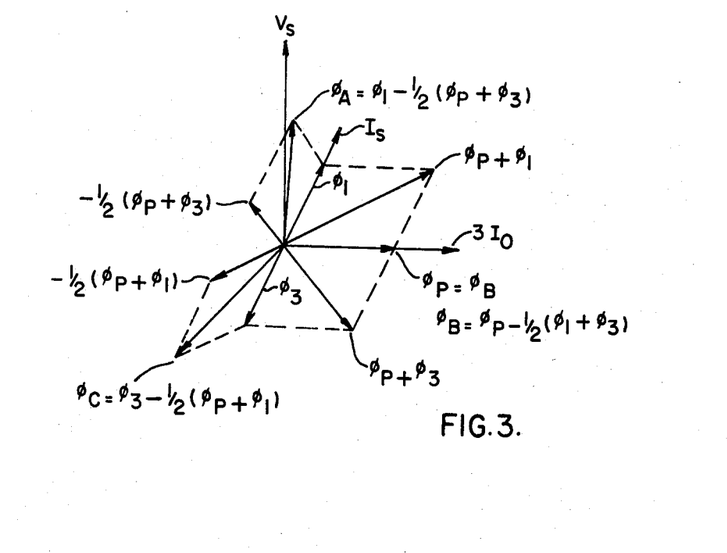
FIG. 3 is a phasor diagram which illustrates the phase relationships between the magnetic fluxes developed in the "operate" electromagnetic of FIG. 3 by the zero sequence current $3I_0$, which fluxes produce the "operate" torque in the electroconductive armature of the relay.

FIG. 3 is a phasor diagram which illustrates the phase relationships between the torque producing magnetic fluxes $\phi_A$, $\phi_B$ and $\phi_C$, respectively. As shown, the flux $\phi_B$ is the same as the flux $\phi_P$, which links the secondary winding 72, and this flux is in phase with the $3I_0$ current. The secondary voltage $V_s$ leads the $3I_0$ current by 90°, and the secondary current $I_s$ lags the secondary voltage $V_s$ slightly. The flux produced by the flow of the secondary current $I_s$ in windings 70 and 68 is shown as flux $\phi_1$ and $\phi_2$, which are equal in magnitude but opposite in direction. With the above-identified relationships being established, fluxes $\phi_A$, $\phi_B$ and $\phi_C$ may now be stated as follows:

$$\phi_A = \phi_1 - \tfrac{1}{2}(\phi_P + \phi_3) \qquad (1)$$

$$\phi_B = \phi_P - \tfrac{1}{2}(\phi_1 + \phi_3) \qquad (2)$$

$$\phi_C = \phi_3 - \tfrac{1}{2}(\phi_P + \phi_1) \qquad (3)$$

The relationships set forth by equations (1), (2) and (3) are developed in the phasor diagram of FIG. 3, and the results indicate that the fluxes $\phi_A$, $\phi_B$ and $\phi_C$ are out of phase, i.e., disposed in time, and since they are displaced spacewise in the direction of proposed armature rotation, they create a torque in armature 24, as a function of the $3I_0$ exciting current, i.e., $K|3I_0|^2$, where K is a constant determined by the characteristics of the magnetic circuit and windings. The rotational direction of this torque is selected such that the contact 28 will be carried by armature 24 in the contact closing direction.

Figure 4:
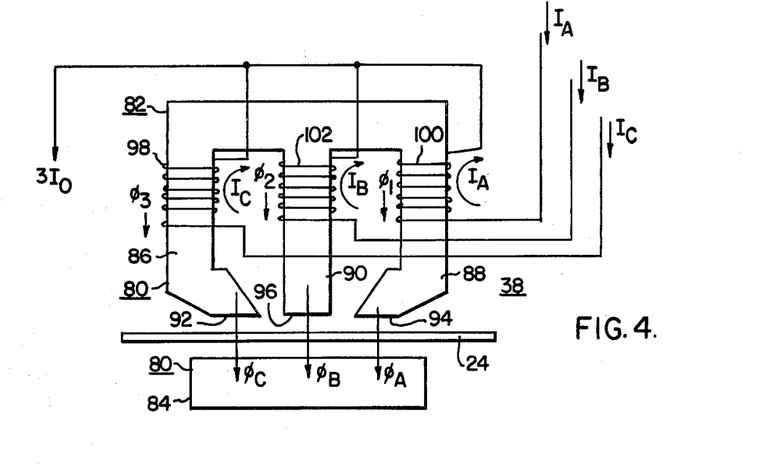
FIG. 4 schematically illustrates a "restraint" electromagnet constructed according to the teachings of the hereinbefore mentioned co-pending application.

The second electromagnet 38 is shown in FIG. 4 as being constructed according to the teachings of the hereinbefore mentioned co-pending application, wherein the three legs of an E unit are excited by the three phase currents. More specifically, the second electromagnet 38 includes a magnetic core structure 80 having an E-shaped unit 82 disposed on one side of armature 24, and a keeper unit 84 disposed on the other. The E unit 82 includes first and second outer legs 86 and 88, respectively, and an inner leg 90, the ends of which define pole faces 92, 94, 96, respectively, which are disposed in predetermined spaced relation with one side of armature 24. The keeper unit 84 is disposed in predetermined spaced relation on the other side of armature 24, to provide a flux path of low reluctance close to the pole faces 92, 94 and 96.

Windings 98, 100 and 102 are disposed in inductive relation with the first and second outer legs 86 and 88, and inner leg 90, respectively, with winding 100 being energized in response to the magnitude of the phase A current $I_A$, i.e. via current transformer 40, winding 102 being energized in response to the phase B current $I_B$, i.e. via current transformer 42, and winding 98 being energized in response to the phase C current $I_C$, i.e. via current transformer 44. The magnetic fluxes produced by current flow through windings 100, 102 and 98 may be referred to as $\phi_1$, $\phi_2$ and $\phi_3$, respectively, and the magnetic fluxes which cross the gaps between the pole faces 94, 96 and 92 and the keeper unit 84 may be referred to as fluxes $\phi_A$, $\phi_B$ and $\phi_C$, respectively.

Figure 5:
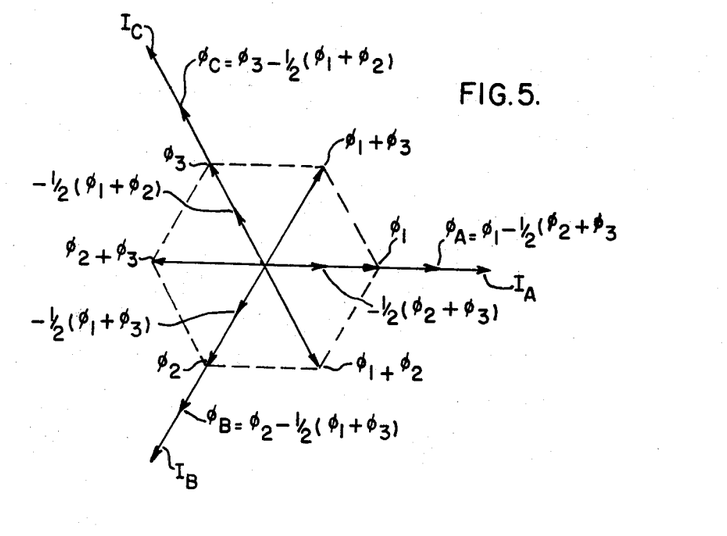
FIG. 5 is a phasor diagram which illustrates the phase relationships between the magnetic fluxes developed in the "restraint" electromagnet of FIG. 5 by positive sequence current, which fluxes produce the restraint torque in the electroconductive armature of the relay.

FIG. 5 is a phasor diagram which illustrates the developement of fluxes $\phi_A$, $\phi_B$ and $\phi_C$, as well as their relative phase positions. The phase currents $I_A$, $I_B$ and $I_C$ in FIG. 5 represent the positive sequence currents in the electrical power distribution system, and thus they are 120° out of phase with one another, and they have the rotational sequence A, B, C. Thus, they may be placed in the phasor diagram of FIG. 5 as illustrated. Their resulting magnetic fluxes $\phi_1$, $\phi_2$ and $\phi_3$ are in phase with the currents $I_A$, $I_B$ and $I_C$, and they may also be placed on the diagram. By examining FIG. 4, it can be seen that the fluxes $\phi_A$, $\phi_B$ and $\phi_C$ may be defined by the following equations:

$$\phi_A = \phi_1 - \tfrac{1}{2}(\phi_2 + \phi_3) \quad (4)$$

$$\phi_B = \phi_2 - \tfrac{1}{2}(\phi_1 + \phi_3) \quad (5)$$

$$\phi_C = \phi_3 - \tfrac{1}{2}(\phi_1 + \phi_2) \quad (6)$$

Using the relationships of equations (4), (5) and (6), FIG. 5 develops the pole fluxes $\phi_A$, $\phi_B$ and $\phi_C$, and it can be seen that they are in phase with the line currents $I_A$, $I_B$ and $I_C$, respectively. The torque developed is a restraining torque, and it is thus in the contact opening direction. The torque is a function of the positive sequence current $I_1$ minus the negative sequence current $I_2$, i.e. $K(|I_1|^2 - |I_2|^2)$. The constant K is determined by the magnetic circuit and the number of turns in the electrical windings.

Figure 6:
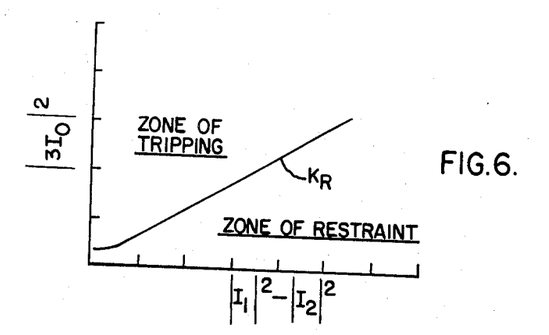
FIG. 6 is a graph which illustrates the operating characteristic of the ratio ground relay shown in FIG. 1.

The ratio ground relay 12 has a characteristic as shown in FIG. 6 which plots the zero sequence current $3I_0$ on the ordinate and the difference between the positive and negative sequence currents on the abscissa. The line $K_R$ separates the tripping and restraint zones. A ratio of a quantity on the ordinate to a quantity on the abscissa which exceeds line $K_R$ causes tripping, while a ratio which falls below line $K_R$ is a restraint zone. While the ratio ground relay of the hereinbefore mentioned co-pending application operates satisfactorily, providing the characteristic shown in FIG. 6, it has been found by tests that the relay does not respond equally to a given fault for all single phase-to-ground possiblities. It will be noted that the length of the flux path for the magnetic lines of force produced by currents $I_A$ and $I_C$, with current $I_B$ equal to zero, i.e., phase B opened, is greater than the length of the magnetic flux path produced by currents $I_A$ and $I_B$ with current $I_C$ equal to zero, and greater than the length of the magnetic flux path produced by currents $I_B$ and $I_C$, with current $I_A$ equal to zero. This difference in the lengths of the magnetic paths for the different fault combinations causes the restraint electromagnetic 38 to produce less restraint torque when phase B is opened, than when phase A or phase C is opened, for faults of equal imedance. Thus, instead of the line $K_R$ in the relay characteristics set forth in FIG. 6 being in the same location for like faults on all three phases, it will drop slightly for a fault with phase B opened, compared with its position for faults with phases A or C opened.

The present invention improves upon the relay of the hereinbefore mentioned co-pending application by providing a ratio ground relay which has an equality of response. This is accomplished by energizing one outer leg of the E-unit as a function of one of the phase currents minus the next or second one of the phase currents in the rotational sequence ABC, and by energizing the other outer leg as a function of the remaining one of the phase currents minus the second one of the phase currents. The inner leg is devoid of exciting windings.

Figure 7:
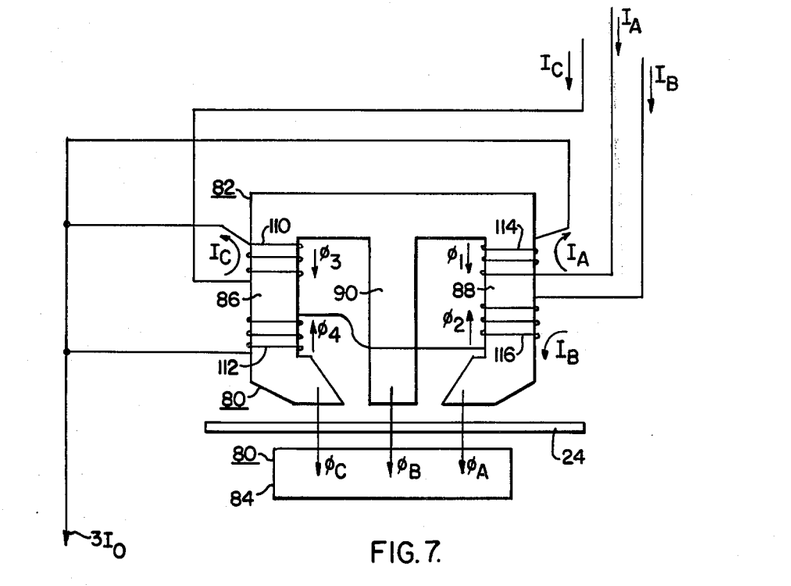
FIG. 7 schematically illustrates a "restraint" electromagnet constructed according to the teachings of the invention.

FIG. 7 schematically illustrates the invention by showing a restraint electromagnet 38'. The magnetic core structure 80 may be the same as in the FIG. 4 structure, and it is thus given the same reference numerals. First and second windings 110 and 112, respectively, having a like number of turns, are wound on the first outer leg 86, and first and second windings 114 and 116, respectively, also having a like number of turns, are wound on the second outer leg 88.

The second outer leg 88 is energized as a function of a first one of the line currents minus the next or second one. Thus, if the phase A line current $I_A$ is selected to be the first one, it will be used to energize the first winding 114. The phase B line current $I_B$ follows current $I_A$ in the rotational sequence and it is thus the second one, and it is used to energize the second winding 116. Since leg 88 is energized as a function of their differences, the currents $I_A$ and $I_B$ are connected such that if they were of like phase they would produce directly opposing fluxes. Thus, winding 114 is indicated in FIG. 7 as producing a flux $\phi_1$ in one direction, and winding 116 is indicated as producing a flux $\phi_2$ in the opposite direction.

The first outer leg 86 is energized as a function of the remaining or third one $I_C$ of the line currents minus the second one, which has already been determined as being line current $I_B$. Thus, winding 110 is excited by current $I_C$ and winding 112 by current $I_B$. These phase currents are connected to the windings of this leg such that currents of like phase would provide opposing fluxes in leg 86. Thus, current $I_C$ is connected to provide a flux $\phi_3$ in one direction and current $I_B$ is connected to provide a flux $\phi_4$ in the opposite direction. Fluxes $\phi_1$ and $\phi_3$ are selected to indicate similar directions in their respective legs, and fluxes $\phi_2$ and $\phi_4$ are selected to indicate similar directions in their respective legs, but of course opposite to the direction of fluxes $\phi_1$ and $\phi_3$, respectively.

Figure 7A:
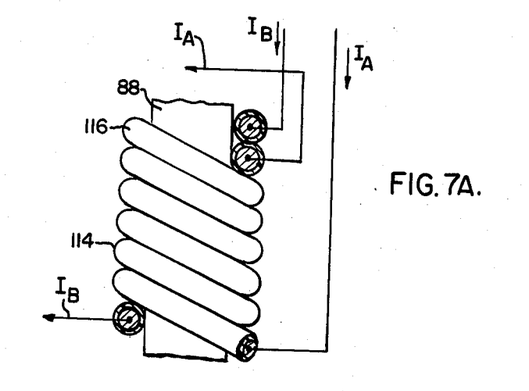
FIG. 7A is a fragmentary, elevational view of a portion of the restraint electromagnet shown in FIG. 7, illustrating a preferred bifilar winding arrangement for the two windings of each outer core leg.

The range of ampere turns over which an electromagnet appears linear depends upon the level at which the magnetic core begins to saturate. At that level, the addition of ampere turns from two different coils, such as coils or windings 114 and 116, will become less accurate because all of the magnetic lines of force produced by one coil will not link all of the turns of the other coil. This effect of saturation can be reduced by winding the turns of the two coils side-by-side in a bifilar manner to enhance their magnetic coupling with one another even though the magnetic core becomes saturated. FIG. 7A is a fragmentary view of winding leg 88 which illustrates this bifilar embodiment of the invention relative to windings 114 and 116. Windings 110 and 112 on leg 86 would be wound in a similar manner.

Figure 8:
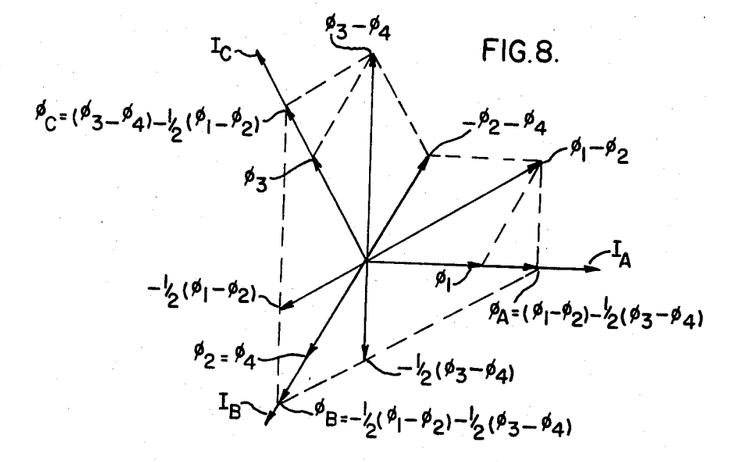
FIG. 8 is a phasor diagram illustrating that the restraint electromagnet of FIG. 7 provides the same rotating magnetic field as the restraint electromagnet of FIG. 5 in response to positive sequence current.

FIG. 8 is a phasor diagram descriptive of the restraint electromagnet construction of FIG. 7 which illustrates that the winding arrangement, and the connection thereof in FIG. 7, although entirely different than the FIG. 4 arrangement, produces rotating pole fluxes which have the same phase relationships as the FIG. 4 arrangement. Upon examining the FIG. 7 arrangement, the following equations for the pole fluxes $\phi_A$, $\phi_B$ and $\phi_C$ may be deveoped:

$$\phi_A = (\phi_1 - \phi_2) - \tfrac{1}{2}(\phi_3 - \phi_4) \tag{7}$$

$$\phi_B = -\tfrac{1}{2}(\phi_1 - \phi_2) - \tfrac{1}{2}(\phi_3 - \phi_4) \tag{8}$$

$$\phi_C = (\phi_3 - \phi_4) - \tfrac{1}{2}(\phi_1 - \phi_2) \tag{9}$$

The line currents $I_A$, $I_B$ and $I_C$ are shown in their 120° relationship with ABC rotation for positive sequence. The fluxes developed by these currents are positioned on the diagram with $\phi_1$ in phase with $I_A$, $\phi_2$ and $\phi_4$ in phase with $I_B$, and $\phi_3$ in phase with $I_C$. The relationships of equations (7), (8) and (9) are then developed from these phasors, and, as shown, the pole fluxes $\phi_A$, $\phi_B$ and $\phi_C$ are in phase with the line currents $I_A$, $I_B$ and $I_C$, respectively, and thus the induction disc or armature 24 is subjected to the same rotating magnetic field in the arrangement of FIG. 7 as it is in the arrangement of FIG. 4. Thus, the torque provided by the FIG. 7 arrangement is equally a function of $K(|I_1|^2 - |I_2|^2)$, with the added advantage of having equal responses for all single phase to ground fault combinations.

Figure 9:
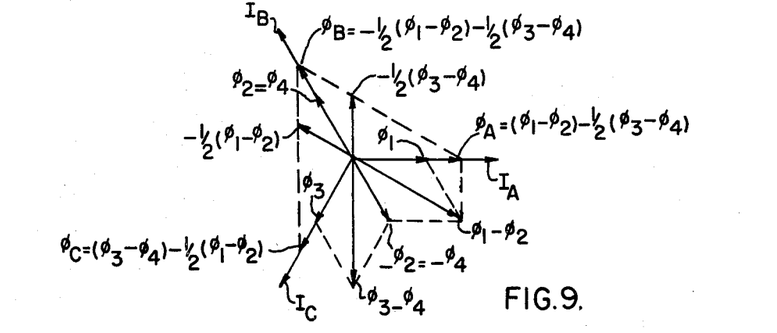
FIG. 9 is a phasor diagram which illustrates the magnetic fluxes produced in the restraint electromagnet of FIG. 7 by negative sequence current, which provides a torque which opposes the restraint torque provided by the flux produced by the positive sequence current.
Figure 10:
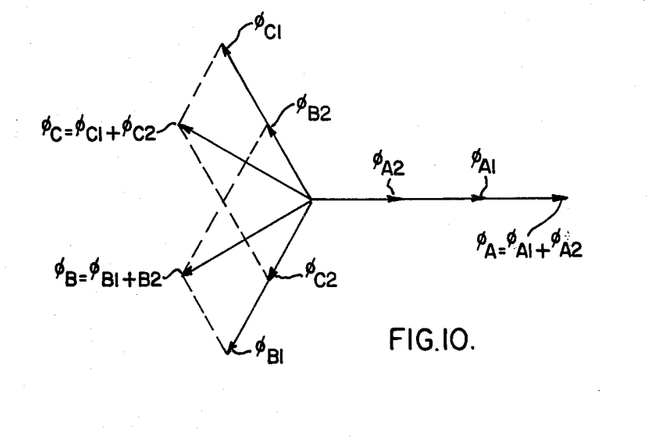
FIG. 10 is a phasor diagram which combines the magnetic fluxes produced by the positive and negative sequence currents, as set forth in FIGS. 8 and 9, to show the resultant magnetic fluxes.

FIG. 9 is a phasor diagram which illustrates the pole fluxes developed in response to negative sequence current $I_2$ which has a phase rotation ACB. FIG. 10 is a phasor diagram which combines the pole fluxes from the positive sequence phasor diagram of FIG. 8, which are now referenced as $\phi_{A1}$, $\phi_{B1}$ and $\phi_{C1}$, with the pole fluxes from the negative sequence phasor diagram of FIG. 9, now reference as $\phi_{A2}$, $\phi_{B2}$ and $\phi_{C2}$. With negative sequence current present, the angle between the resulting pole fluxes $\phi_B$ and $\phi_C$ is reduced from 120°, reducing the resultant torque. The resultant torque continues to be reduced as the negative sequence current increases relative to the magnitude of the positive sequence current. When the negative sequence current is equal to the positive sequence current, the angle between phasors $\phi_B$ and $\phi_C$ is zero, their direction is opposite to phasor $\phi_A$, and their sum is equal to the magnitude of $\phi_A$. Thus, no torque is produced in this situation. If the negative sequence current $I_2$ now increases above the magnitude of the positive sequence current $I_1$, the phasors $\phi_B$ and $\phi_C$ pass one another, and the resultant rotation of fluxes $\phi_A$, $\phi_B$ and $\phi_C$ is ACB, which reverses the torque direction applied to armature 24 in the same manner that reversing any two electrical phases causes a three-phase induction motor to reverse its rotational direction.

In summary, there has been disclosed a new and improved electromagnetic ratio ground relay which functions in a manner similar to the ratio ground relay of the hereinbefore mentioned copending application, i.e., the operating torque is a function of $K|3I_0|^2$ and the restraint torque is a function of $K(|I_1|^2 - |I_2|^2)$, while improving upon this relay by having an equality of response for a given single phase-to-ground fault regardless of the faulted phase.

I claim as my invention:

1. An induction disc ratio ground relay for detecting open phases and phase-to-ground faults in a three-phase electrical power system, having means providing signals responsive to the three phase currents and the zero sequence current at the relaying point, a first electromagnet which provides an operating torque which is a function of the zero sequence current, and a second electromagnet having a three-legged magnetic core structure and electrical windings which are energized by the three phase current signals to provide a restraining torque which is a function of the positive sequence current minus the negative sequence current, and electrical contacts actuatable in response to a predetermined relationship between the operating and restraining torques, the improvement comprising: the windings of the second electromagnet are arranged on at least two of the three legs of the three-legged magnetic core structure and energized by the three phase current signals such that the length of the magnetic flux path is the same for each of the three possible phase-to-ground faults, to provide similar restraining torques for similar faults, regardless of the faulted phase.

2. An induction disc ratio ground relay for detecting open phases and phase-to-ground faults in a three-phase electrical power system, having a first electromagnet which provides an operating torque which is a function of the zero sequence current, and a second electromagnet having a three-legged magnetic core structure and electrical windings which are energized by the three phase currents to provide a restraining torque which is a function of the positive sequence current minus the negative sequence current, and electrical contacts actuatable in response to a predetermined relationship between the operating and restraining torques, the improvement comprising:

the three-legged magnetic core structure of the second electromagnet includes first and second outer legs and an inner leg, with said inner leg being devoid of electrical windings, the windings of the second electromagnet are arranged on the magnetic core structure and energized by the three phase currents such that the length of the magnetic flux path is the same for each of the three possible phase-to-ground faults, to provide similar restraining torques for similar faults, regardless of the faulted phase.

3. An induction disc ratio ground relay for detecting open phases and phase-to-ground faults in a three-phase electrical power system, having a first electromagnet which provides an operating torque which is a function of the zero sequence current, and a second electromagnet having a three-legged magnetic core structure and electrical windings which are energized by the three phase currents to provide a restraining torque which is a function of the positive sequence current minus the negative sequence current, and electrical contacts actuatable in response to a predetermined relationship between the operating and restraining torques, the improvement comprising: the windings of the second electromagnet are arranged on the magnetic core structure and energized by the three phase currents such that the length of the magnetic flux path is the same for each of the three possible phase-to-ground faults, to provide similar restraining torques for similar faults, regardless of the faulted phase, with the three-legged magnetic core structure of the second electromagnet including first and second outer legs and an inner leg, and with the windings of the second electromagnet including first winding means on the first outer leg energized as a function of a first one of the phase currents minus a second one of the phase currents, and second winding means on the second outer leg energized as a function of the remaining third one of the phase currents minus said second one of the phase currents.

4. The relay of claim 3, wherein the first winding means includes first and second electrical windings wound and energized by the first and second ones of the phase currents, respectively, to provide opposing magnetic fluxes in the first outer winding leg, and the second winding means includes third and fourth electrical windings wound and energized by the third and second ones of the phase currents, respectively, to provide opposing magnetic fluxes in the second outer winding leg.

5. The relay of claim 4, wherein the first and second electrical windings are bifilar and the third and fourth electrical windings are bifilar.

6. A relay for detecting open phases and phase-to-ground faults in a three-phase electrical power system, including high impedance phase-to-ground faults, comprising:

an electroresponsive induction device having an electroconductive armature mounted for movement, first and second means for providing magnetic fluxes which act on said electroconductive armature to produce operating and restraining torques, respectively, and electrical contact means actuatable by said electroconductive armature to provide a predetermined signal when the operating and restraining torques have a predetermined relationship, said second means being an electromagnet which includes a magnetic core structure having first and second outer legs, an inner leg, and associated pole faces positioned adjacent to said electroconductive armature, first winding means on the first outer leg energized as a function of a first one of the phase currents minus a second one, and second winding means on the second outer leg energized as a function of the remaining third one of the phase currents minus said second one, to provide equal magnetic flux paths in the magnetic core structure for each of the three possible phase-to-ground fault combinations, and provide similar restraining torques for similar faults, regardless of the faulted phase.

* * * * *